(12) United States Patent
Cutaia

(10) Patent No.: US 7,995,590 B2
(45) Date of Patent: Aug. 9, 2011

(54) METHOD AND SYSTEM FOR COMMUNICATING H.263 MACROBLOCK BOUNDARIES USING H.221 BAS FOR RFC2190-COMPLIANT FRAGMENTATION

(75) Inventor: Nicholas Joseph Cutaia, Brighton, MA (US)

(73) Assignee: Cisco Technology, Inc., San Jose, CA (US)

( * ) Notice: Subject to any disclaimer, the term of this patent is extended or adjusted under 35 U.S.C. 154(b) by 554 days.

(21) Appl. No.: 11/692,140

(22) Filed: Mar. 27, 2007

(65) Prior Publication Data

US 2008/0240123 A1      Oct. 2, 2008

(51) Int. Cl.
    *H04L 12/28*        (2006.01)
(52) U.S. Cl. ........ 370/401; 370/260; 370/352; 370/466; 709/204; 709/231; 375/240.03; 375/240.24
(58) Field of Classification Search ............ 370/401, 370/351, 264, 360, 352, 466; 375/240.03, 375/240.24, 354; 348/14.09, 14.1; 709/204, 709/231
    See application file for complete search history.

(56) References Cited

U.S. PATENT DOCUMENTS

| | | | | |
|---|---|---|---|---|
| 5,673,080 A * | 9/1997 | Biggs et al. | ............... | 348/14.09 |
| 5,898,457 A * | 4/1999 | Nagao et al. | ............... | 348/14.1 |
| 5,936,662 A * | 8/1999 | Kim et al. | ............... | 348/14.09 |
| 5,953,050 A * | 9/1999 | Kamata et al. | ............ | 348/14.09 |
| 6,111,924 A * | 8/2000 | McKinley | ................... | 375/354 |
| 6,357,028 B1 * | 3/2002 | Zhu | ............................. | 714/751 |
| 6,584,093 B1 * | 6/2003 | Salama et al. | ............... | 370/351 |
| 6,683,909 B1 * | 1/2004 | Falco | ....................... | 375/240.24 |
| 2004/0252651 A1 * | 12/2004 | Karlsen et al. | ............... | 370/264 |
| 2004/0252681 A1 * | 12/2004 | Rabipour et al. | ........... | 370/360 |

OTHER PUBLICATIONS

Zhu, C., "RTP Payload Format for H.263 Video Streams," The Internet Society, Network Working Group, RFC No. 2190, Sep. 1997, pp. 1-12.
International Telecommunication Union, "Frame structure for a 64 to 1920 kbit/s channel in audiovisual teleservices," Series H: Audiovisual and Multimedia Systems, Infrastructure of audiovisual services—Transmission multiplexing and synchronization, ITU-T, H.221, Mar. 2004.

* cited by examiner

*Primary Examiner* — Dang T Ton
*Assistant Examiner* — Mandish Randhawa
(74) *Attorney, Agent, or Firm* — Marger Johnson & McCollom, P.C.

(57) ABSTRACT

A method includes receiving a Real-Time Transport Protocol (RTP) packet at a first gateway and translating the RTP packet into a H.221 frame. The H.221 frame includes a H.263-compressed video bitstream. The H.221 frame may also include a H.221 Bit-Rate Allocation Signal (BAS) message to communicate RFC2190-compliant fragmentation boundary information containing Macroblock (MB) boundary to a second gateway, if there is no picture start code (PSC) or Group of Block start code (GBSC) at a start portion of the RTP packet. The method further includes transmitting the H.221 frame from the first gateway to the second gateway; and fragmenting the H.263 video bitstream contained in the H.221 frame at a PSC, a GBSC, or a Macroblock (MB) boundary contained in the H.221 BAS fragmentation message.

23 Claims, 6 Drawing Sheets

100

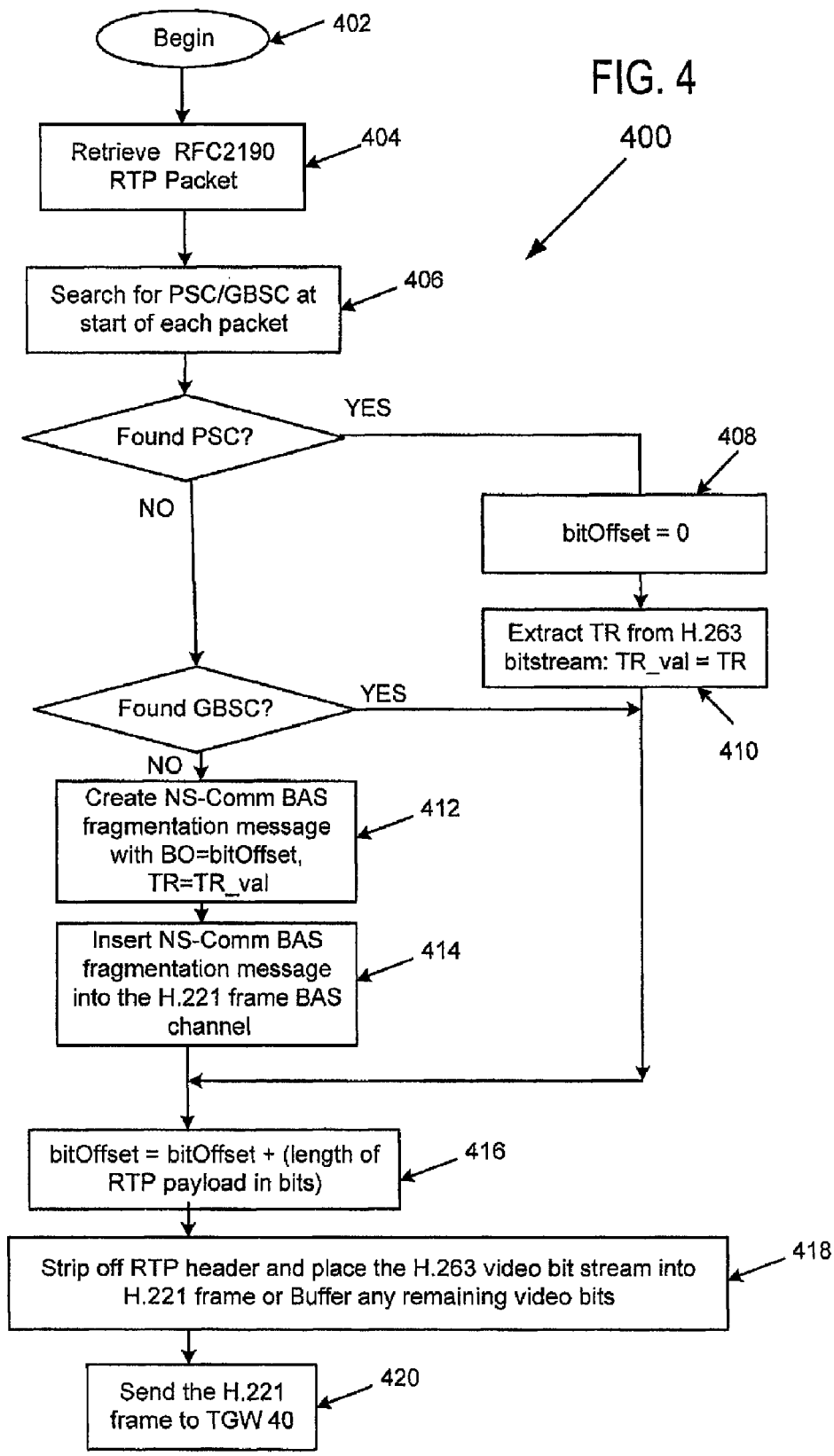

METHOD AND SYSTEM FOR COMMUNICATING H.263 MACROBLOCK BOUNDARIES USING H.221 BAS FOR RFC2190-COMPLIANT FRAGMENTATION

TECHNICAL FIELD

The present disclosure relates generally to communications, and more specifically to a method and system for communicating H.263 Macroblock (MB) boundaries using H.221 Bitrate Allocation Signal (BAS) for RFC2190-compliant fragmentation.

BACKGROUND

The International Telecommunications Union (ITU) adopts ITU-T Recommendation H.320 ("H.320") and ITU-T Recommendation H.323 ("H.323") as the international standards for videoconferencing. H.320 standard allows videoconferencing over Integrated Service Digital Network (ISDN) and other circuit switched networks and services (e.g., Public Switched Telephone Network). In H.320, video bits are transmitted as frames compliant with ITU-T Recommendation H.221 ("H.221"). H.323 standard extends the H.320 standard series to handle data flow across the Internet and Local Area Networks (LANs). In H.323, video bits are transmitted as Real-Time Transport Protocol (RTP) packets. RTP provides end-to-end network transport functions suitable for applications transmitting real-time data over multicast or unicast network services (RTP is defined by the Internet Engineering Task Force (IETF), and is described in RFC3550). Other packet-based video conferencing protocols that also use the RTP for media transport include Session Initiation Protocol (SIP), Media Gateway Control Protocol (MGCP), and Skinny Client Control Protocol (SCCP) among others.

H.263 video stream is defined by ITU-T Recommendation H.263 ("H.263") for video coding at low data rates. In H.263, each picture starts with a Picture Start code (PSC), which is a 22-bit word with a value of '0000 0000 0000 0000 1 00000'. In H.263, each picture may be divided into Group of Blocks (GOB), and each GOB may start with a Group of Block Start Code (GBSC), which is a 17-bit word with a value of '0000 0000 0000 0000 1'. Each GOB can be further divided into a fixed number of Macroblocks (MB). Each MB does not start with a unique identifying start code, such as the PSC or the GBSC described above.

IETF RFC2190 specifies the payload format for encapsulating H.263 bitstream in a RTP packet. In particular, for each RTP video packet, the RTP fixed header is followed by a H.263 payload header, which is followed by the H.263 compressed video bitstream. There are three modes for the H.263 payload header. Each RTP packet can use one of the three modes for the H.263 video stream depending on the desired network packet size and H.263 encoding options employed. The shortest H.263 payload header (mode A) supports fragmentation at a GBSC or a PSC. In other words, mode A is used for packets starting with a fixed starting code: GBSC or PSC. The long H.263 payload headers (mode B and C) support fragmentation at a Macroblock (MB) boundary. Mode B and C are necessary for a GOB whose size is larger than the maximum network packet size allowed in the underlying protocol (e.g., 1500 bytes), thus making it impossible to fit one complete GOB in a packet. In the latter case, the H.263 video bits are fragmented at a MB boundary.

In the media plane of a H.320 video gateway, video bits are transported as RTP packets using one of the many packet-based signaling protocols (e.g., H.323, SIP, or MGCP) on the packet side of the gateway, and as H.221 frames using H.320 protocol on the telephony side of the gateway. When translating from H.320 protocol to a packet-based protocol at the gateway, the video bits must be fragmented at precise locations according to RFC standards, such as RFC2190. For example, the video bits may be fragmented at a PSC or a GBSC for mode A packets, or at a MB boundary for mode B and C packets. The video bitstream is searched bit-by-bit for the PSC, GBSC or the MB boundary. Finding the PSC or GBSC is a relatively low-complexity task since the PSC and GBSC are fixed values. But finding the MB boundary may require an excessive amount of processor execution time and memory on the gateway processor due to the bit-oriented processing and the variable length coding (VLC) of the H.263 scheme. In the latter case, a full H.263 decoder is required for such precise fragmentation. If the packet is fragmented arbitrarily rather than at its precise boundary location, which may happen when the gateway only implements a reduced complexity H.263 decoder to determine the fragmentation boundary, potential video impairment may occur.

Therefore, it is beneficial to provide a scheme for precise fragmentation of H.263 video bitstreams at a H.320 video gateway without over-burdening the H.320 video gateway processor with the fragmentation task.

DESCRIPTION OF EXAMPLE EMBODIMENTS

Overview

A method is provided to communicate H.263 Macroblock boundaries using H.221 Bitrate Allocation Signal (BAS) for RFC2190-compliant fragmentation, which includes receiving a Real-Time Transport Protocol (RTP) packet at a first gateway and translating the RTP packet into a H.221 frame. The H.221 frame includes a H.263-compressed video bitstream. The H.221 frame may include a H.221 Bit-Rate Allocation Signal (BAS) message to communicate RFC2190-compliant fragmentation boundary information to a second gateway, if there is no picture start code (PSC) or Group of Block start code (GBSC) at a start portion of the RTP packet. The method further includes transmitting the H.221 frame from the first gateway to the second gateway; and fragmenting the H.263 video bitstream contained in the H.221 frame at one of a PSC, a GBSC, or a Macroblock (MB) boundary contained in the H.221 BAS message.

A system for communicating H.263 Macroblock boundaries using H.221 Bitrate Allocation Signal (BAS) for RFC2190-compliant fragmentation, includes a first endpoint coupled to a first gateway via a first IP network, the first gateway is configured to translate a received RTP packet into a H.221 frame, the H.221 frame including a H.263-compressed video bitstream. The H.221 frame may also include a H.221 Bit-Rate Allocation Signal (BAS) message to communicate RFC2190-compliant fragmentation boundary information containing MB boundary to a second gateway, only if there is no picture start code (PSC) or Group of Block start code (GBSC) at a start portion of the RTP packet. A second endpoint is coupled to the second gateway via a second IP network. The second gateway is configured to fragment the H.263 video bitstream at one of a PSC, a GBSC, or the Macroblock (MB) boundary contained in the H.221 BAS message. The first gateway and the second gateway are coupled to each other via a circuit switched network (e.g., a Public Switched Telephone Network (PSTN), or an Integrated Service Digital Network (ISDN)).

BRIEF DESCRIPTION OF THE DRAWINGS

The foregoing and other objects, advantages and features will become more readily apparent by reference to the following detailed descriptions in conjunction with the accompanying drawings.

FIG. 4 is a flow chart illustrating an example method with respect to an originating gateway for communicating fragmentation boundary information using the example system of FIG. 1.

DESCRIPTIONS

Figure 1:
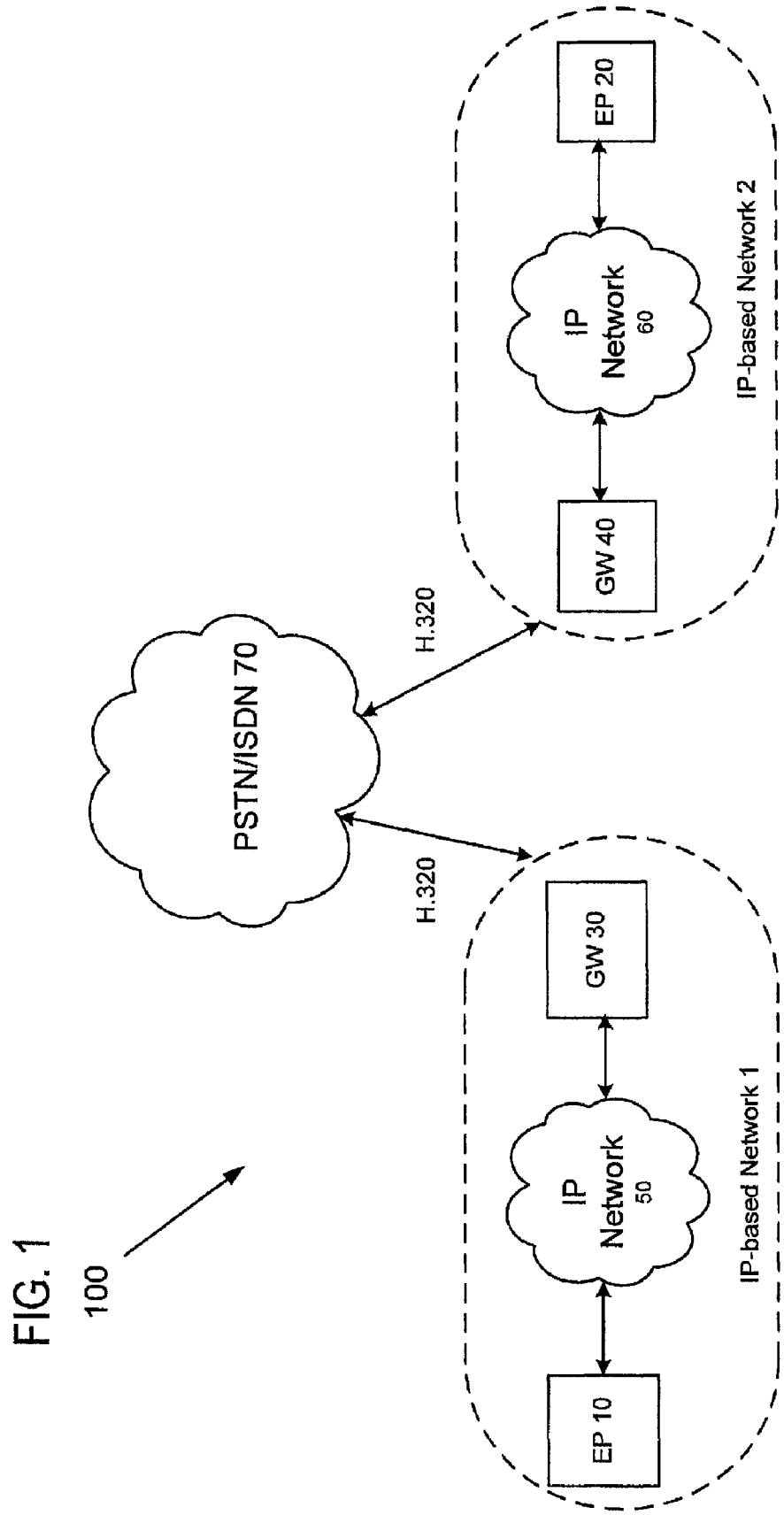
FIG. 1 is a schematic block diagram illustrating an example system for communicating H.263 MB boundaries using H.221 BAS for RFC2190-compliant fragmentation.

FIG. 1 is a schematic block diagram illustrating an example system 100 for communicating H.263 MB boundaries using H.221 BAS for RFC2190-compliant fragmentation. It should be recognized that FIG. 1 may include other elements, which have not been illustrated in order to simplify the figure and which are not necessary to understand the example system disclosed below. System 100 described and illustrated herein may be implemented in software, firmware or hardware, or any suitable combination thereof. Preferably, the method and system are implemented in software, for purposes of low cost and flexibility.

Communication system 100 includes two endpoints, EP 10 and EP 20, each located at the opposite end of system 100. EP10 and EP 20 may be any terminals or devices compliant with packet-based protocols that use the RTP for media transport, which may include H.323, SIP, MGCP, SCCP, and others. For example, EP10 and EP 20 may be H.323-compliant LAN endpoints operable to transmit and receive H.263 video bits as RTP packets using H.323. However, the example system 100 is not limited to only H.323-complaint terminals, and may include other types of terminals or devices that use RTP to transmit and receive H.263 video bits.

One of the endpoints may be the originating endpoint, whereas the other may be the terminating endpoint. The designation of "originating" and "terminating" is relative to each other, depending on where the communication is initiated.

Each endpoint (EP 10 and EP 20) is connected to a gateway via a computer data network. Computer data networks 50 and 60 may be any data network that allows the transmission of audio and/or video signals. In communication system 100 illustrated in FIG. 1, networks 50 and 60 are Internet Protocol (IP) networks.

Gateways 30 and 40 are any network devices that allow audio, video, and data translation to occur between IP-based networks (e.g., IP-based networks 1 and 2) and legacy-based H.320 systems (e.g., ISDN/PSTN 70). For example, IP-based networks 1 and 2 may be H.323 networks consisting of H.323-complaint end terminals. However, the example system 100 is not limited to only H.323 networks, and may include other types of networks, As shown in FIG. 1, communication between the two IP-based networks is via PSTN/ISDN network 70 compliant with H.320. In the example system and method illustrated herein, gateways 30 and 40 are commonly referred to as the H.320 video gateways.

Figure 2:
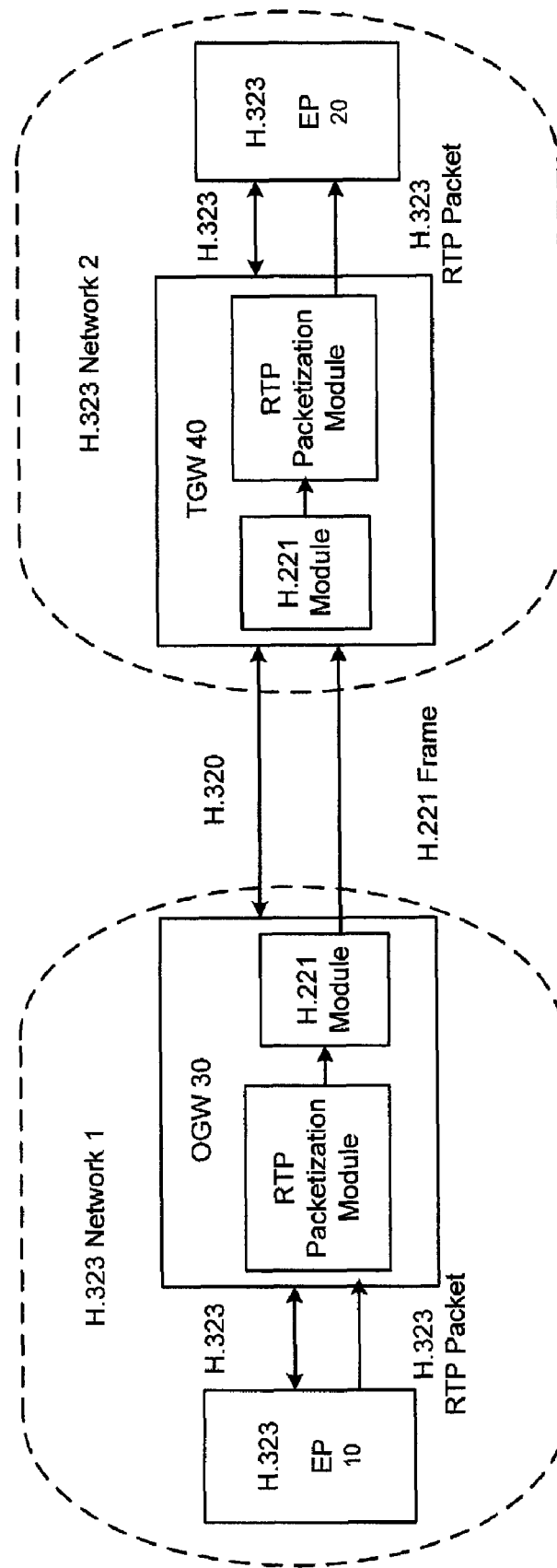
FIG. 2 is a schematic block diagram detailing pertinent aspects of the example system of FIG. 1.

FIG. 2 is a schematic block diagram detailing pertinent aspects of example system of FIG. 1. For ease of illustration, assume EP 10 is the originating endpoint, and EP 20 is the terminating endpoint. Further assume gateway 30 is the originating gateway (OGW), and gateway 40 is the terminating gateway (TGW). In addition, EP 10 and EP 20 are H.323-compliant end terminals operable to transmit and receive H.263 video bits as RTP packets using H.323.

Referring to FIG. 2, EP 10 initiates a communication with EP 20 by transmitting H.263 video bits as H.323 RTP packets to OGW 30. The H.263 video bits are encapsulated in the RTP packets according to RFC2190. For each RTP video packet, a RTP fixed header is followed by a H.263 payload header, which is followed by the H.263 compressed bitstream. Each of the gateways 30 and 40 includes a RTP packetizer module and a H.221 module. The RTP packetizer module is responsible for RTP packetization and de-packetization on the IP-side of the gateway, and the H.221 module is responsible for H.221 framing and de-framing on the H.221 side of the gateway.

OGW 30 searches for either a PSC or a GBSC at the start of each packet. If there is a PSC or a GBSC, then the RTP packetizer module in OGW 30 depacketizes the RTP packet by stripping off the RTP fixed header. The H.221 module generates one or more H.221 frames by placing the raw video bitstream into the video portion of the one or more H.221 frames and sends the one or more H.221 frames to TGW 40.

On the other hand, if OGW 30 cannot find a PSC or a GBSC at the start of each packet either due to the GBSC being omitted or the packet being fragmented at a MB boundary, OGW 30 creates a H.221 BAS fragmentation message containing RFC2190 fragmentation boundary information and immediately begins transmission of the message using the H.221 BAS channel. Since the H.221 BAS channel is limited to only 8 bits for each H.221 frame, the entire H.221 BAS fragmentation message (which occupies more than 8 bits) will span multiple H.221 frames. The fragmentation boundary in the BAS fragmentation message indicates a MB boundary. The video bits contained in the RTP packet are inserted into the video portion of the H.221 frame. If the number of video bits in the RTP packet exceeds the size allocated for a single H.221 frame, then the H.263 video bits would be spread over multiple H.221 frames. OGW 30 transmits the one or more H.221 frames to TGW 40.

On the TGW, TGW 40 monitors the H.221 BAS channel in the arriving H.221 frames for any H.221 BAS fragmentation messages containing the fragmentation boundary information. When such a message has arrived, the message content is stored in a queue within the RTP packetization module in TGW 40.

During RTP packetization, TGW 40 packetizes each of the received H.221 frame into one or more RTP packets, or alternatively buffers the data contained in the H.221 frame when there is a lack of boundary information and the size of the H.221 video channel is smaller than the Maximum Transmission Unit (MTU) size of the underlying network. The TGW provides this means of H.221 frame buffering to allow for the full H.221 BAS fragmentation message to arrive at the TGW.

TGW 40 searches bit by bit the video bitstream contained in the H.221 frame for a PSC or a GBSC and counts the number of bits in the H.263 video bitstream which have already been packetized. If the RTP packetizer finds a PSC or a GBSC, then a RFC2190 mode A RTP packet is created and sent to EP 20.

However, if the RTP packetizer cannot find a PSC or a GBSC and the number of bits in the H.263 video stream that has been packetized or accumulated exceeds the MTU size, it will search the queue containing the H.221 BAS fragmentation messages to find the bit offset (BO) for the picture where the packet should be fragmented. In the latter case, a RFC2190 mode B RTP packet is created and sent to EP 20. On the other hand, if the number of video bits accumulated is less than the MTU size of the underlying network, the data in the H.263 video bitstream is buffered and awaits the arrival of the next H.221 frame to continue the bit by bit search through the H.263 video data.

Figure 3:
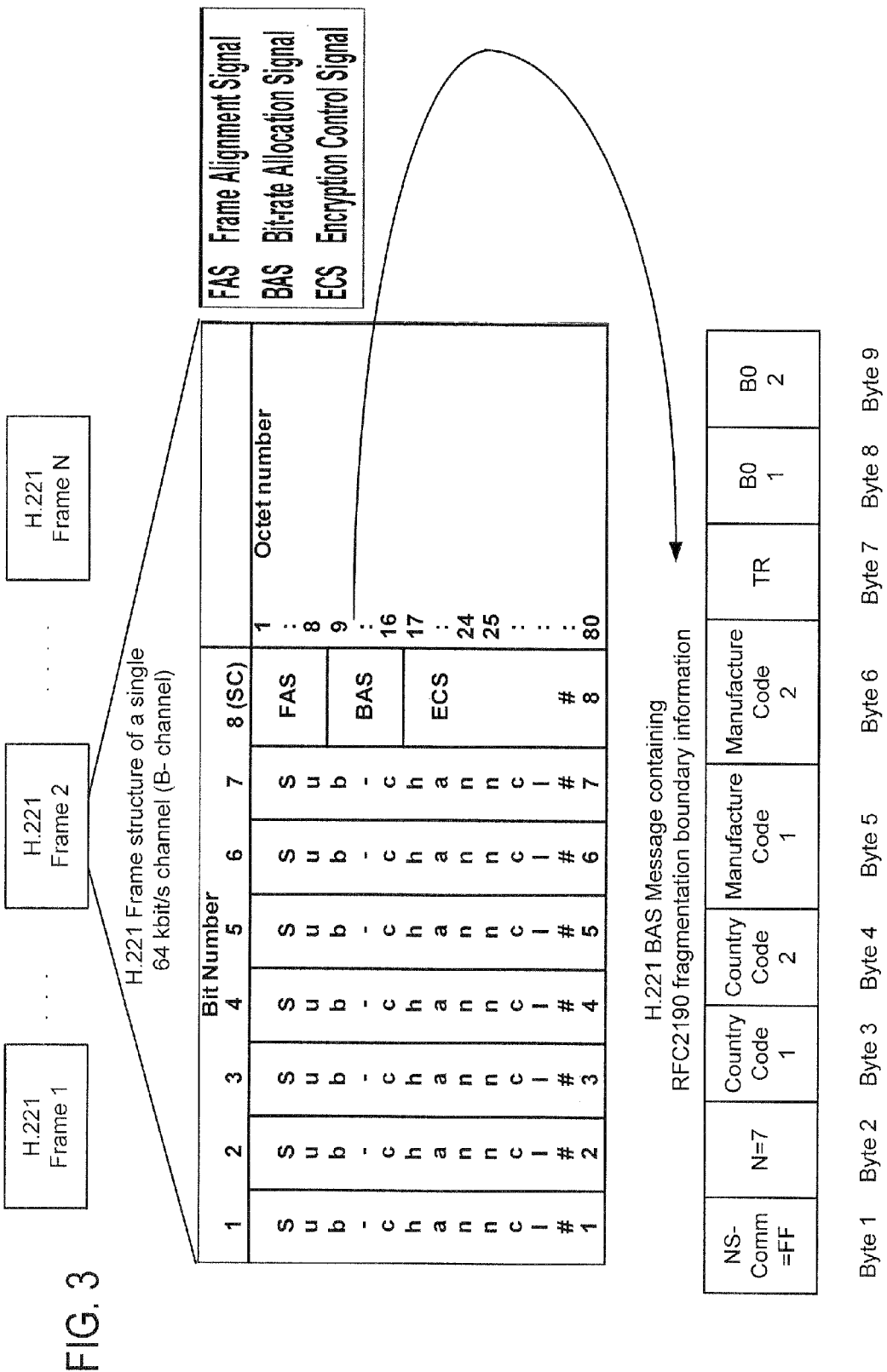
FIG. 3 is an example message format of a H.221 BAS fragmentation message in a H.221 frame to communicate each fragmentation boundary in the example system of FIG. 1.

FIG. 3 is an example message format for a H.221 BAS fragmentation message in a H.221 frame to communicate each fragmentation boundary within the example system of FIG. 1.

As shown in FIG. 3, an H.221 frame for a single 64 kbit/s channel (B-channel) contains 80 octets (8 bits per octet). Each H.221 frame includes an 8-bit BAS channel, which contains the H.221 BAS fragmentation message. The example message format of a H.221 BAS fragmentation message to communicate each fragmentation boundary follows the convention specified in ITU-T Recommendation H.221 Appendix A Section A.9 (Escape table values). The NS-comm which defines the non-ITU command message is used for this specific purpose, so that gateways that do not support the BAS fragmentation signaling may just ignore this message without any interruption to the communication process. An example NS-comm H.221 BAS fragmentation message is shown below:

Byte1: NS-comm=FF
Byte2: value of N (7)
Byte3: country code byte 1
Byte4: country code byte 2
Byte5: manufacture code byte 1
Byte6: manufacture code byte 2
Byte 7: TR=temporal reference
Byte8-9: BO=Bit offset from PSC (16 bits)

The TR field (a unique 8-bit field immediately following the PSC in the H.263 bitstream, which contains the Temporal Reference of the reference picture) is used within the BAS fragmentation message to indicate which specific picture in the video stream needs to be fragmented at a boundary that does not begin with a PSC or a GBSC; in other words, TR indicates the particular picture which needs to be fragmented at a MB boundary. The BO (Bit offset) is a 16-bit field which indicates the number of bits from the start of the PSC that the fragmentation will occur. Since each H.221 frame has an 8-bit BAS channel, and the BAS fragmentation message has a total of 9 bytes, so each 8-bit BAS channel contains only one byte of the example H.221 BAS fragmentation message, with the remaining 8 bytes included in the BAS channel of each of the eight succeeding H.221 frames.

The NS-comm H.221 BAS fragmentation message may be communicated continuously as long as the H.263 video call is active. In addition, there is sufficient bandwidth to communicate each BAS fragmentation message, given that the bandwidth for each BAS channel of each ISDN-B channel is 50 bytes/second and there are up to 16 ISDN-B channels that may be used during a single H.320 video session. As such, the effective bandwidth of each BAS signaling channel ranges from 50 bytes/second to 800 bytes/second, sufficiently to handle the relatively low bandwidth mechanism used to transmit the BAS fragmentation messages. By transmitting the fragmentation boundaries (i.e., MB boundary) found in the H.263 video bitstream on OGW 30 using the BAS signaling channel in the H.221 frame, TGW 40 may run at a high channel density without searching extensively for fragmentation boundary information.

FIG. 4 is a flow chart illustrating an example method 400 with respect to an originating gateway for communicating fragmentation boundary information using the example system of FIG. 1.

Method 400 begins at step 402. At step 404, OGW 30 retrieves a RFC2190 RTP packet. At step 406, OGW 30 searches for either a PSC or a GBSC at the start of each packet. If there is a PSC at the start of each packet, at step 408, OGW 30 sets the value for 'bitOffset' to 0, and at step 410, OGW 30 extracts the 8-bit field containing the Temporal Reference of the reference picture from the H.263 bitstream and sets 'TR' to that 8-bit value. At step 416, OGW 30 increments the value for 'bitOffset' by the length of RTP payload in bits. At step 418, OGW 30 strips off the RTP fixed header and places the raw H.263 video bitstream into the video portion of a H.221 frame. Alternatively at step 418, OGW 30 places a portion of the raw video bits in a H.221 frame, and buffers the remaining portion of the video bits. This may happen if a H.221 frame cannot fit all of the raw video bitstream contained in the RTP packet. The buffered video bits will be transmitted in successive H.221 frames. At step 420, OGW 30 sends the H.221 frame to TGW 40.

If OGW 30 cannot find a PSC at step 406, but instead finds a GBSC at the start of the packet, then OGW 30 performs steps 416, 418, and 420, as explained above.

Figure 5A:
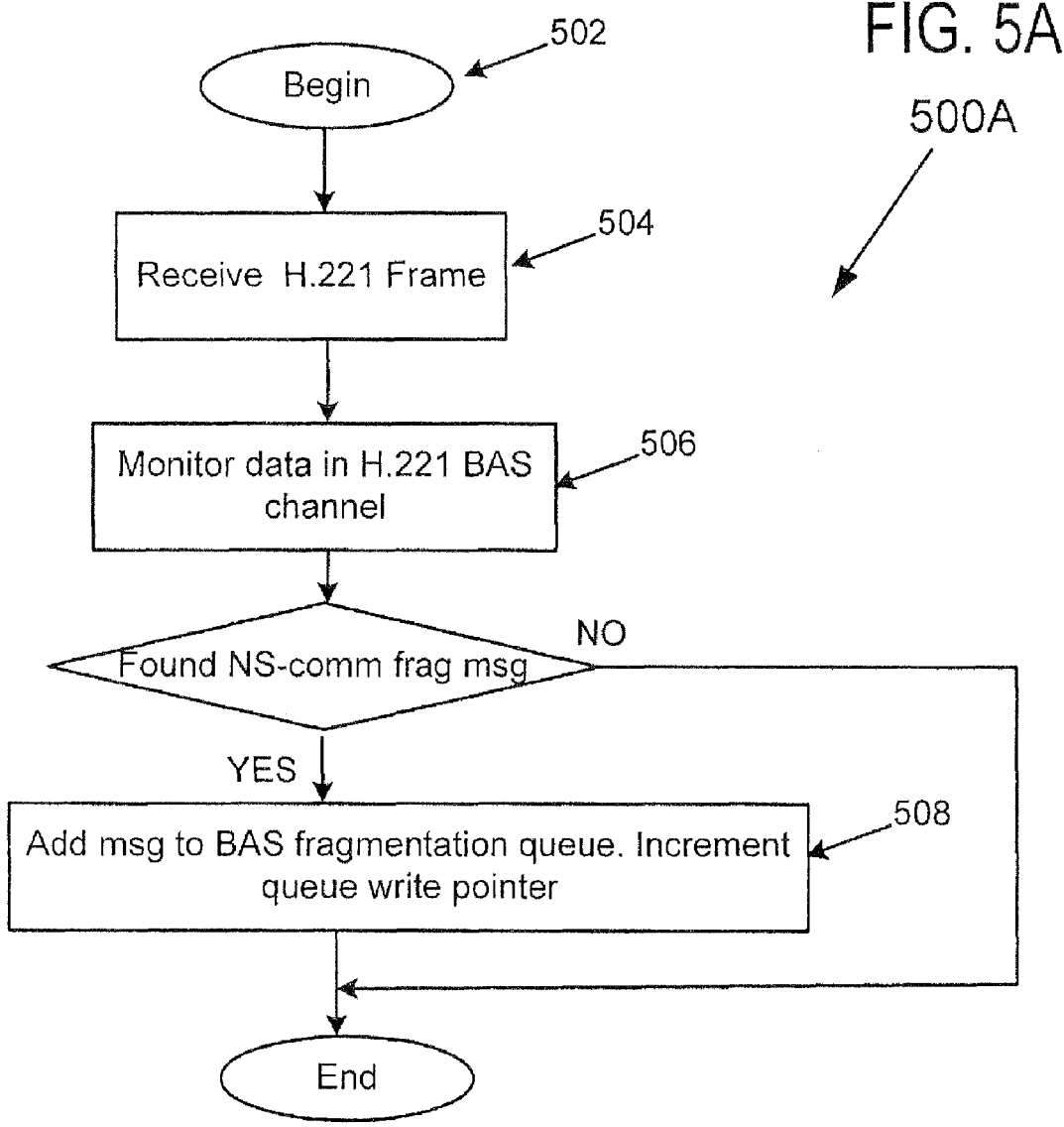
FIG. 5A is a flow chart illustrating an example method with respect to a terminating gateway for communicating fragmentation boundary information using the example system of FIG. 1.

On the other hand, if OGW 30 cannot find either a PSC or a GBSC at the start of the packet (either due to the GBSC being omitted or the packet being fragmented on a MB boundary), then at step 412, OGW 30 creates a NS-comm H.221 BAS fragmentation message containing RFC2190 fragmentation boundary information (the fragmentation boundary indicates fragmentation at a MB boundary). Specifically, the BO field in the NS-comm fragmentation message is set to the value of 'bitOffset', and the TR field is set to the 8-bit field in the H.263 bitstream containing the Temporal Reference of the reference picture. At step 414, the first 8-bits of the H.221 BAS fragmentation message is placed in the H.221 BAS channel of a H.221 frame. The remaining 8 bytes of the H.221 BAS fragmentation message will be transmitted in successive H.221 frames. Following step 414, OGW 30 performs steps 416, 418, and 420, as explained above, FIG. 5A is a flow chart illustrating an example method 500A with respect to a terminating gateway for communicating fragmentation boundary information using the example system of FIG. 1. Specifically, FIG. 5A shows TGW 40 searches for NS-comm fragmentation message in the H.221 BAS channel upon receiving a H.221 frame.

Method 500A begins at step 502. At step 504, TGW 40 receives a H.221 frame. At step 506, TGW 40 monitors the H.221 BAS channel for any NS-comm fragmentation message. As mentioned previously, the NS-comm BAS fragmentation message indicates the occurrence of fragmentation boundary at a MB boundary. If a NS-comm fragmentation message is found in the H.221 BAS channel, at step 508, TGW 40 adds the fragmentation message to a queue containing BAS fragmentation messages and increments the queue's write pointer.

Figure 5B:
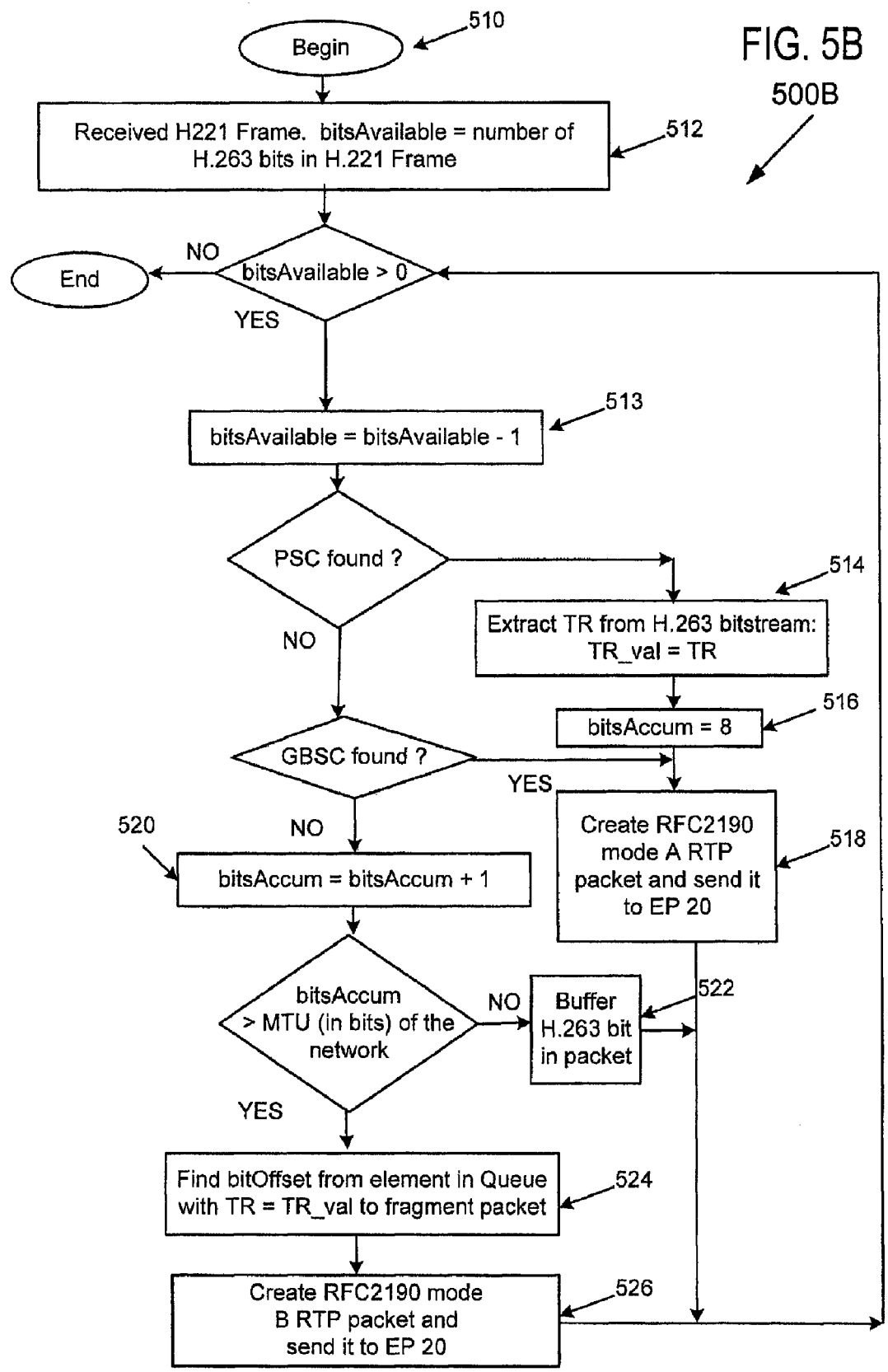
FIG. 5B is a flow chart illustrating an example method with respect to a terminating gateway for communicating fragmentation boundary information using the example system of FIG. 1.

FIG. 5B is a flow chart illustrating an example method 500B with respect to a terminating gateway for communicating fragmentation boundary information using the example system of FIG. 1. Specifically, FIG. 5B shows H.221 video bit extraction and accumulation at the TGW 40 to translate H.221 frames into RFC2190 RTP packets. The methods illustrated in FIGS. 5A and 5B may be performed in parallel. 'bitsAccum' of steps 516 and 520 is a variable value that tracks the number of video bits in the H.221 frame that have already been packetized or accumulated at the gateway. 'bitsAvailable' of step 512 represents the number of video bits available in an H.221 frame to be packetized into one or more RTP packets.

Method 500B begins at step 510. At step 512, TGW 40 receives a H.221 frame containing H.263 video bits, and sets 'bitsAvailable' equal to the number of H.263 video bits in the H.221 frame. If the value for 'bitsAvailable' is less than or equal to 0, method 500B terminates immediately; else at step 513, TGW 40 decrements the value of 'bitAvailable' by 1.

Next, TGW 40 searches bit by bit the video bitstream contained in the H.221 frame for a PSC or a GBSC. If there is a PSC, at step 514, TGW 40 extracts the 8-bit field containing the Temporal Reference of the reference picture from the H.263 bitstream. At step 516, TGW 40 sets the value for 'bitsAccum' to 8 since the TR is an 8-bit value. At step 518. TGW 40 creates a RFC2190 mode A RTP packet and sends it to EP 20.

On the other hand, if TGW 40 cannot find a PSC, but instead finds a GBSC, TGW 40 creates a RFC2190 mode A RTP packet and sends it to EP 20 according to step 518.

If TGW 40 cannot find either a PSC or a GBSC, then at step 520, TGW 40 increments the value for 'bitsAccum' by 1. If the value for 'bitsAccum' exceeds the MTU size of the underlying network, then at step 524, TGW 40 will search the queue containing the BAS fragmentation messages to find the bit offset (BO) for the picture where the packet should be fragmented. At step 526, a RFC2190 mode B RTP packet is created and sent to EP 20. However, if the value for 'bitsAccum' is less than the MTU size of the underlying network, then at step 522, TGW 40 buffers the H.263 video bits and continue the bit by bit search through the H.263 video bits.

The above-described scheme may be used in both directions (e.g., GW 30 to GW 40, and vice versa), as long as the MTU size for IP-based network 1 is the same as the MTU size for IP-based network 2 in the example system of FIG. 1. However, for network topologies that do not have identical MTU size, only one of the gateways in the network topology (e.g., FIG. 1) may be able to use this scheme, while the other cannot. For example, if IP network 2's MTU exceeds IP network 1's MTU, then the scheme may be used only in the direction from GW 30 to GW 40, but not the reverse; on the other hand, if network 2's MTU is less than network 1's MTU, then the scheme can be used only in the direction from GW 40 to GW 30, but not the reverse. In the latter case (i.e., network 2's MTU<network 1's MTU), the H.221 BAS fragmentation message will simply be ignored at GW 40 and a full H.263 decoder must be implemented to ensure there is no video impairment. The H.221 BAS channel bandwidth may be conserved by communicating the network MTU size over the BAS channel using the non-ITU command message, so that a gateway in one network can squelch the transmission of the BAS fragmentation message if it has knowledge that the MTU size of the other network is less than the MTU size of the current network it resides.

The above described method and system allow precise fragmentation of H.263 video streams while using relatively small amount of processing time and memory by communicating the fragmentation boundary information across the H.221 BAS channel. As such, the H.320 video gateway has the advantage of running at a high channel density without over-burdened by the fragmentation task.

Finally, those of skill in the art will appreciate that the method and system described and illustrated herein may be implemented in software, firmware or hardware, or any suitable combination thereof. Preferably, the method and system are implemented in software, for purposes of low cost and flexibility. Those of skill in the art will appreciate that the method and system may be implemented in logics encoded in one or more tangible media for execution in a machine. Alternative embodiments are contemplated and are within the spirit and scope of the following claims.

The invention claimed is:

1. A method comprising:
    receiving a Real-Time Transport Protocol (RTP) packet at a first gateway, the RTP packet including a H.263-compressed video bitstream corresponding to a raw bitstream;
    searching for a Picture Start code (PSC) or a Group of Block start code (GBSC) at a start portion of the RTP packet;
    translating the RTP packet into a H.221 frame;
    transmitting the H.221 frame containing the H.263-compressed video bitstream to a second gateway;
    fragmenting the H.263-compressed video bitstream in the second gateway according to RFC2190;
    communicating a Maximum Transmission Unit (MTU) size of an underlying network between the first gateway and the second gateway in a H.221 BAS channel using a non-ITU command;
    including in the H.221 frame a H.221 Bit-Rate Allocation Signal (BAS) fragmentation message containing a Macroblock (MB) boundary, if the first gateway cannot locate the PSC or the GBSC at the start portion of the RTP packet;
    depacketizing the RTP packet by stripping off a RTP fixed header, generating one or more H.221 frames by placing the raw bitstream in a video portion of the one or more H.221 frames, and sending the one or more H.221 frames to the second gateway, if the first gateway can locate the PSC or the GBSC at the start portion of the RTP packet;
    receiving the H.221 frame containing the H.263-compressed video bitstream at the second gateway;
    setting a 'bitsAvailable' value to a number of H.263 video bits in the H.221 frame, wherein 'bitsAvailable' represents a number of video bits available in the H.221 frame to be packetized into one or more RTP packets at the second gateway;
    searching for a PSC or a GBSC in the H.221 frame at the second gateway;
    incrementing a value of 'bitsAccum' by 1 if the second gateway cannot locate the PSC or the GBSC in the H.221 frame at the second gateway, where 'bitsAccum' comprises a variable value that tracks a number of video bits in the H.221 frame that has already been packetized at the second gateway;
determining whether 'bitsAccum' exceeds the MTU size of the underlying network;
buffering the H.263 video bits in the H.221 frame if 'bitsAccum' does not exceed the MTU size of the underlying network;
finding a bit offset where one of the one or more RTP packets at the second gateway should be fragmented if 'bitsAccum' does exceed the MTU size of the underlying network; and
transmitting the one or more RTP packets at the second gateway to an endpoint.

2. The method of claim 1, in which the RTP packet is encapsulated with a H.263 payload header followed by the H.263-compressed video bitstream according to RFC2190.

3. The method of claim 1, in which the first gateway and the second gateway are configured to translate from H.323 to H.320 and vice versa.

4. The method of claim 1, in which including in the H.221 frame a H.221 Bit-Rate Allocation Signal (BAS) fragmentation message containing a Macroblock (MB) boundary comprises generating a NS-comm H.221 BAS fragmentation message according to ITU-T Recommendation H.221 Appendix A Section A.9 (Escape table values).

5. The method of claim 4, in which the NS-comm H.221 BAS fragmentation message comprising:
a NS-comm field;
a temporal reference (TR) field indicating a specific picture in the H.263-compressed video bitstream to be fragmented at the Macroblock boundary; and
a Bit offset (BO) field indicating a number of bits from a Picture Start code (PSC) in which a fragmentation would occur.

6. The method of claim 5, in which the BO field is a 16-bit field.

7. The method of claim 5, in which the NS-comm field is set to FF.

8. The method of claim 1, in which fragmenting the H.263-compressed video bitstream in the second gateway comprises fragmenting the H.263-compressed video bitstream at one of a PSC, a GBSC, or the Macroblock (MB) boundary.

9. The method of claim 1, further comprising:
detecting a H.221 BAS fragmentation message at the second gateway, if any; and
storing the H.221 BAS fragmentation message in a queue in the second gateway.

10. The method of claim 1, further comprising translating the H.221 frame into one or more of a RFC2190 mode A RTP packet, a RFC2190 mode B RTP packet, and a RFC2190 mode C RTP packet at the second gateway.

11. The method of claim 1, further comprising extracting an 8-bit field containing a Temporal Reference of a reference picture from the H.263-compressed video bitstream and setting the value for 'bitsAccum' to 8 if the second gateway finds a PSC in the H.221 frame at the second gateway.

12. The method of claim 11, further comprising creating an RFC2190 mode A RTP packet.

13. The method of claim 1, further comprising creating an RFC2190 mode A RTP packet if the second gateway finds a GBSC in the H.221 frame at the second gateway.

14. The method of claim 1, wherein the endpoint comprises the first gateway.

15. A system comprising:
a first endpoint coupled to a first gateway via a first network, the first gateway being configured to:
receive a Real-Time Transport Protocol (RTP) packet;
translate the RTP packet into a H.221 frame, the H.221 frame including a H.263-compressed video bitstream corresponding to a raw bitstream;
include in the H.221 frame a H.221 Bit-Rate Allocation Signal (BAS) fragmentation message containing a Macroblock (MB) boundary, if the first gateway cannot locate a Picture Start code (PSC) or a Group of Block start code (GBSC) at a start portion of the RTP packet;
transmit the H.221 frame to a second gateway; and
depacketize the RTP packet by stripping off a RTP fixed header, generate one or more H.221 frames by placing the raw bitstream in a video portion of the one or more H.221 frames, and send the one or more H.221 frames to the second gateway, if the first gateway can locate the PSC or the GBSC at the start portion of the RTP packet;
a second endpoint coupled to the second gateway via a second network, the second gateway being configured to:
receive the H.221 frame from the first gateway;
set a 'bitsAvailable' value to a number of H.263 video bits in the H.221 frame, wherein 'bitsAvailable' represents a number of video bits available in the H.221 frame to be packetized into one or more RTP packets at the second gateway;
search for a PSC or a GBSC in the H.221 frame;
determine whether a 'bitsAccum' value exceeds a Maximum Transmission Unit (MTU) size of an underlying network, where 'bitsAccum' comprises a variable value that tracks a number of video bits in the H.221 frame that has already been packetized at the second gateway;
buffer the H.263 video bits in the H.221 frame if 'bitsAccum' does not exceed the MTU size of the underlying network;
find a bit offset where one of the one or more RTP packets at the second gateway should be fragmented if 'bitsAccum' does exceed the MTU size of the underlying network; and
transmit the one or more RTP packets at the second gateway to another endpoint; and
the first gateway and the second gateway coupled to each other via a circuit switched network comprising the underlying network.

16. The system of claim 15, in which the first endpoint and the second endpoint are H.323-compliant terminals.

17. The system of claim 15, in which the first gateway and the second gateway are configured to translate between H.323 and H.320 protocols.

18. The system of claim 15, in which the second gateway is configured to:
detect a H.221 BAS fragmentation message, if any;
store the H.221 BAS fragmentation message in a queue;
fragment the H.263-compressed video bitstream according to RFC2190; and
translate the H.221 frame into a RTP packet.

19. The system of claim 15, in which fragmenting the H.263-compressed video bitstream comprises fragmenting the H.263-compressed video bitstream at one of a PSC, a GBSC, or the Macroblock (MB) boundary.

20. The system of claim 15, in which translating the H.221 frame into a RTP packet comprises translating the H.221 frame into one or more of a RFC2190 mode A RTP packet, a RFC2190 mode B RTP packet, and a RFC2190 mode C RTP packet.

21. The system of claim 15, in which the first gateway and the second gateway are coupled to each other via a Public Switched Telephone Network (PSTN) or an Integrated Service Digital Network (ISDN).

22. The system of claim 15, in which the second gateway is further configured to increment a value of 'bitsAccum' by 1 if the second gateway cannot locate a PSC or a GBSC in the H.221 frame, where 'bitsAccum' comprises a variable value that tracks a number of video bits in the H.221 frame that has already been packetized at the second gateway.

23. The system of claim 15, in which the other endpoint comprises the first endpoint.

* * * * *

UNITED STATES PATENT AND TRADEMARK OFFICE
CERTIFICATE OF CORRECTION

| | | |
|---|---|---|
| PATENT NO. | : 7,995,590 B2 | |
| APPLICATION NO. | : 11/692140 | |
| DATED | : August 9, 2011 | |
| INVENTOR(S) | : Nicholas Joseph Cutaia | |

It is certified that error appears in the above-identified patent and that said Letters Patent is hereby corrected as shown below:

Column 10, line 62, the word "15" should read --18--;
Column 10, line 66, the word "15" should read --18 --.

Signed and Sealed this
Twenty-eighth Day of February, 2012

David J. Kappos
*Director of the United States Patent and Trademark Office*